US010737469B2

(12) United States Patent
Droste et al.

(10) Patent No.: US 10,737,469 B2
(45) Date of Patent: Aug. 11, 2020

(54) VEHICLE ANTENNA PANE

(71) Applicant: SAINT-GOBAIN GLASS FRANCE, Courbevoie (FR)

(72) Inventors: Stefan Droste, Herzogenrath (DE); Bernd Stelling, Bielefeld (DE); Guillaume Francois, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 437 days.

(21) Appl. No.: 15/555,063

(22) PCT Filed: Mar. 30, 2016

(86) PCT No.: PCT/EP2016/056974
§ 371 (c)(1),
(2) Date: Aug. 31, 2017

(87) PCT Pub. No.: WO2016/162251
PCT Pub. Date: Oct. 13, 2016

(65) Prior Publication Data
US 2018/0037006 A1 Feb. 8, 2018

(30) Foreign Application Priority Data
Apr. 8, 2015 (EP) ..................... 15162763

(51) Int. Cl.
*H01Q 1/12* (2006.01)
*H01Q 13/10* (2006.01)
(Continued)

(52) U.S. Cl.
CPC .. *B32B 17/10183* (2013.01); *B32B 17/10036* (2013.01); *B32B 17/10293* (2013.01);
(Continued)

(58) Field of Classification Search
CPC ............. H01Q 1/1271; H01Q 9/0407; H01B 7/08–0861
See application file for complete search history.

(56) References Cited

U.S. PATENT DOCUMENTS 3,459,879 A   8/1969 Gerpheide
4,768,037 A * 8/1988 Inaba ............... B32B 17/10
                                         343/713
(Continued)

FOREIGN PATENT DOCUMENTS

CN    1518782 A    8/2004
CN    1778017 A    5/2006
(Continued)

OTHER PUBLICATIONS

International Search Report issued for International Application No. PCT/EP2016/056974, filed Mar. 30, 2016 on behalf of Saint-Gobain Glass France, dated Jun. 3, 2016. 7 pages (German Original + English Translation).
(Continued)

*Primary Examiner* — Ricardo I Magallanes
(74) *Attorney, Agent, or Firm* — Pillsbury Winthrop Shaw Pittman LLP

(57) ABSTRACT

A vehicle antenna pane for separating a vehicle interior from external surroundings is presented. The pane has features that include an inner pane, an outer pane, at least one intermediate layer that connects an internal surface of the outer pane areally to an external surface of the inner pane, a planar antenna structure that is arranged between the inner pane and the outer pane, and a base plate that is arranged on an interior side in relation to the antenna structure. A dielectric is arranged between the antenna structure and the base plate, the dielectric being provided by means of the
(Continued)

Figure 1A:
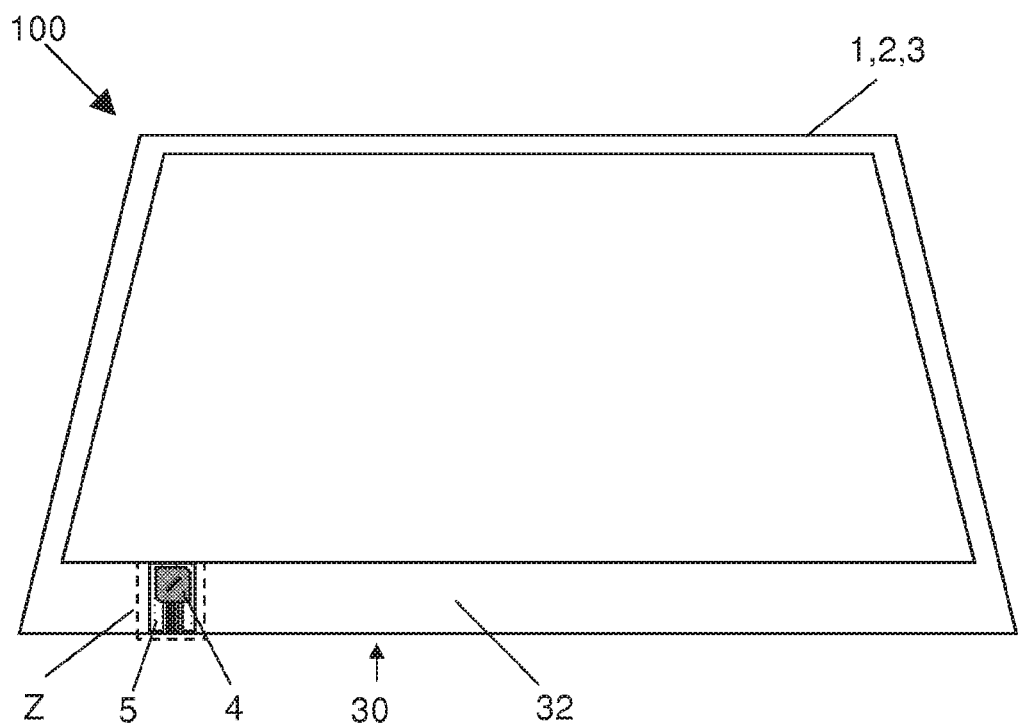

inner pane and the intermediate layer. A base of the antenna structure has a ratio of a length to a width of 1:1 to 10:1.

35 Claims, 13 Drawing Sheets

(51) Int. Cl.
  *H01Q 5/378* (2015.01)
  *H01Q 9/06* (2006.01)
  *B32B 17/10* (2006.01)
  *H01Q 9/04* (2006.01)

(52) U.S. Cl.
  CPC ......... *H01Q 1/1271* (2013.01); *H01Q 9/0407* (2013.01); *H01Q 9/0428* (2013.01)

(56) References Cited

U.S. PATENT DOCUMENTS

| | | | |
|---|---|---|---|
| 5,363,114 A | | 11/1994 | Shoemaker |
| 5,670,966 A | | 9/1997 | Dishart et al. |
| 5,760,744 A | * | 6/1998 | Sauer ............... B32B 17/10036 29/600 |
| 5,867,238 A | | 2/1999 | Miller et al. |
| 6,025,806 A | | 2/2000 | Deininger et al. |
| 6,118,410 A | | 9/2000 | Nagy |
| 6,285,326 B1 | | 9/2001 | Diximus |
| 6,313,796 B1 | | 11/2001 | Potin et al. |
| 6,320,276 B1 | | 11/2001 | Sauer |
| 6,322,881 B1 | | 11/2001 | Boire et al. |
| 6,791,496 B1 | | 9/2004 | Killen |
| 6,809,692 B2 | | 10/2004 | Puente Baliarda et al. |
| 7,388,548 B2 | | 6/2008 | Maeuser |
| 7,545,333 B2 | | 6/2009 | Li et al. |
| 7,903,042 B2 | | 3/2011 | Urban et al. |
| 9,171,658 B2 | | 10/2015 | Reul et al. |
| 10,347,964 B2 | | 7/2019 | Droste et al. |
| 2002/0045037 A1 | | 4/2002 | Boire et al. |
| 2003/0112190 A1 | | 6/2003 | Puente Baliarda et al. |
| 2004/0178961 A1 | | 9/2004 | Maeuser et al. |
| 2004/0200812 A1 | | 10/2004 | Grewell et al. |
| 2004/0200821 A1 | | 10/2004 | Voeltzel |
| 2006/0109178 A1 | | 5/2006 | Takeuchi et al. |
| 2006/0139223 A1 | | 6/2006 | Li et al. |
| 2006/0202898 A1 | | 11/2006 | Li et al. |
| 2006/0273966 A1 | | 12/2006 | Maeuser |
| 2007/0045264 A1 | | 3/2007 | Nekoda et al. |
| 2007/0216589 A1 | * | 9/2007 | Li ..................... H01Q 1/1271 343/713 |
| 2010/0141539 A1 | | 6/2010 | Thole et al. |
| 2011/0221652 A1 | | 9/2011 | Li et al. |
| 2011/0230146 A1 | | 9/2011 | Morishita et al. |
| 2011/0233182 A1 | | 9/2011 | Baranski |
| 2011/0248900 A1 | | 10/2011 | De Rochemont et al. |
| 2011/0279335 A1 | | 11/2011 | Degen et al. |
| 2012/0162047 A1 | | 6/2012 | Mizuno et al. |
| 2013/0050983 A1 | | 2/2013 | Labrot et al. |
| 2013/0099981 A1 | | 4/2013 | Vortmeier et al. |
| 2013/0141289 A1 | | 6/2013 | Vortmeier et al. |
| 2014/0060921 A1 | | 3/2014 | Reul et al. |
| 2014/0176374 A1 | | 6/2014 | Lo |
| 2015/0232067 A1 | | 8/2015 | Schall et al. |
| 2017/0317399 A1 | | 11/2017 | Droste et al. |
| 2018/0037007 A1 | | 2/2018 | Droste et al. |

FOREIGN PATENT DOCUMENTS

| | | |
|---|---|---|
| CN | 1946644 A | 4/2007 |
| CN | 101223711 A | 7/2008 |
| CN | 102246590 A | 11/2011 |
| CN | 103228438 A | 7/2013 |
| DE | 3834075 A1 | 4/1989 |
| DE | 19536131 C1 | 1/1997 |
| DE | 19605999 A1 | 8/1997 |
| DE | 19735395 A1 | 2/1998 |
| DE | 19858227 C1 | 6/2000 |
| DE | 19832228 C2 | 5/2002 |
| DE | 10106125 A1 | 8/2002 |
| DE | 20210286 U1 | 12/2002 |
| DE | 10301352 B3 | 7/2004 |
| DE | 10319606 A1 | 11/2004 |
| DE | 202004001446 U1 | 3/2005 |
| DE | 10351488 A1 | 6/2005 |
| DE | 102004056866 A1 | 1/2006 |
| DE | 202004019286 U1 | 4/2006 |
| DE | 202006011919 U1 | 10/2006 |
| DE | 102008018147 A1 | 10/2009 |
| DE | 102008029986 A1 | 1/2010 |
| DE | 202008017611 U1 | 4/2010 |
| DE | 202010011837 U1 | 5/2011 |
| DE | 102012008033 A1 | 11/2012 |
| EP | 0608180 A1 | 7/1994 |
| EP | 0720249 A2 | 7/1996 |
| EP | 0847965 B1 | 6/1998 |
| EP | 1624527 A1 | 2/2006 |
| EP | 1898675 A2 | 3/2008 |
| EP | 2400591 A1 | 12/2011 |
| FR | 2913141 A3 | 8/2008 |
| JP | H06256044 A | 9/1994 |
| JP | H09502073 A | 2/1997 |
| JP | 2006121536 A | 5/2006 |
| JP | 2006522565 A | 9/2006 |
| JP | 2007251936 A | 9/2007 |
| JP | 2013522962 A | 6/2013 |
| WO | 00/22695 A1 | 4/2000 |
| WO | 2009/015975 A1 | 2/2009 |
| WO | 2009/099427 A1 | 8/2009 |
| WO | 2010/081589 A1 | 7/2010 |
| WO | 2011/144680 A1 | 11/2011 |
| WO | 2012/052315 A1 | 4/2012 |
| WO | 2012/136411 A1 | 10/2012 |
| WO | 2016/096432 A1 | 6/2016 |
| WO | 2016/162251 A1 | 10/2016 |
| WO | 2016/162252 A1 | 10/2016 |

OTHER PUBLICATIONS

International Search Report issued for International Application No. PCT/EP2016/056975, filed Mar. 30, 2016 on behalf of Saint-Gobain Glass France, dated Jun. 13, 2016. 7 pages (German Original + English Translation).

Canadian Office Action for Canadian Application No. 2,979,601 filed Sep. 13, 2017 on behalf of Saint-Gobain Glass France, dated Jul. 19, 2018. 4 pages.

Canadian Office Action for Canadian Application No. 2,979,604 filed on Sep. 13, 2017 on behalf of Saint-Gobain Glass France, dated Jul. 16, 2018 3 pages.

Chinese Office Action for Chinese Application No. 201580017710.8 filed on Dec. 2, 2015 on behalf of Saint-Gobain Glass France, dated Nov. 16, 2018. 12 pages. (Chinese Original + English Summary).

Chinese Office Action for Chinese Application No. 201680000920.0 filed on Sep. 27, 2016 on behalf of Saint-Gobain Glass France, dated Aug. 31, 2018. 22 pages. (Chinese Original + English Translation).

Chinese Office Action for Chinese Application No. 201680000923.4 filed on Sep. 27, 2016 on behalf of Saint-Gobain Glass France, dated Aug. 31, 2018. 22 pages. (Chinese Original + English Translation).

International Preliminary Report on Patentability for International Application No. PCT/EP2012/053245 filed on Feb. 27, 2012 on behalf of Saint-Gobain Glass France, dated Oct. 8, 2013. 17 pages. (English Translation + German Original).

International Preliminary Report on Patentability for International Application No. PCT/EP2015/078342 filed on Dec. 2, 2015 on behalf of Saint-Gobain Glass France, dated Jun. 20, 2017. 12 pages. (English Translation + German Original).

International Preliminary Report on Patentability for International Application No. PCT/EP2016/056975 filed on Mar. 30, 2016 on behalf of Saint-Gobain Glass France, dated Oct. 10, 2017. 14 pages. (English Translation + German Original).

(56) References Cited

OTHER PUBLICATIONS

International Preliminary Report on Patentability for PCT Patent Application No. PCT/EP2016/056974 filed on Mar. 30, 2016 on behalf of Saint-Gobain Glass France, dated Oct. 10, 2017. 14 pages. (English Translation + German Original).
International Search Report for International Application No. PCT/EP2012/053245, filed on Feb. 27, 2012, on behalf of Saint-Gobain Glass France, dated May 11, 2012. 5 pages. (English Translation + German Original).
International Search Report for International Application No. PCT/EP2015/078342 filed Dec. 2, 2015 on behalf of Saint-Gobain Glass France, dated Mar. 8, 2016. 4 pages. (English Translation + German Original).
Japanese Office Action for Japanese Application No. 2017-552950 filed on Oct. 6, 2017 on behalf of Saint-Gobain Glass France, dated Nov. 28, 2018. 9 pages. (Japanese Original + English Translation).
Japanese Office Action for Japanese Application No. 2017-552951 filed on Oct. 6, 2017 on behalf of Saint-Gobain Glass France, dated Nov. 21, 2018. 6 pages. (Japanese Original + English Translation).
Korean Office Action for Korean Application No. 10-2017-7027615 filed on Sep. 28, 2017 on behalf of Saint-Gobain Glass France, dated Jul. 19, 2018. 11 pages. (Korean Original—English Translation).
Non-Final Office Action for U.S. Appl. No. 15/525,935, filed May 10, 2017, on behalf of Saint-Gobain Glass France, dated Oct. 29, 2018. 24 pages.
Notice of Allowance for U.S. Appl. No. 14/110,124, filed Nov. 21, 2013, on behalf of Saint-Gobain Glass France, dated Sep. 18, 2015. 13 pages.
Notice of Allowance for U.S. Appl. No. 15/525,935, filed May 10, 2017 on behalf of Saint-Gobain Glass France, dated Mar. 21, 2019. 13 pages.
Restriction Requirement for U.S. Appl. No. 14/110,124, filed Nov. 21, 2013, on behalf of Saint-Gobain Glass France, dated Jun. 10, 2015. 11 pages.
Restriction Requirement for U.S. Appl. No. 15/555,069, filed Aug. 31,2017 on behalf of Saint-Gobain Glass France, dated Jun. 19, 2019. 7 pages.
Written Opinion for International Application No. PCT/EP2015/078342 filed Dec. 2, 2015 on behalf of Saint-Gobain Glass France, dated Mar. 8, 2016. 10 pages. (English Translation + German Original).
Written Opinion for International Application No. PCT/EP2012/053245, filed on Feb. 27, 2012, on behalf of Saint-Gobain Glass France, dated May 11, 2012. 15 pages.
PCT Written Opinion for PCT/EP2016/056974 filed Mar. 30, 2016 in the name of Saint-Gobain Glass France, dated Jun. 3, 2016. 12 pages. (English +German).
PCT Written Opinion for PCT/EP2016/056975 filed Mar. 30, 2016 in the name of Saint-Gobain Glass France, dated Jun. 13, 2016. 12 pages. (English + German).

* cited by examiner

A-A'

B-B'

A-A'

B-B'

A-A'

B-B'

(a) Producing a stack sequence of an inner pane (1), at least one intermediate layer (3), and an outer pane (2), wherein a planar antenna structure (4) is arranged between the inner pane (1) and the outer pane (2), and a base plate (5) is arranged on the interior side in relation to the antenna structure (4)

↓

(b) Laminating the stack sequence to form a vehicle antenna pane (100) as a composite pane

Fig. 7

VEHICLE ANTENNA PANE

CROSS REFERENCE TO RELATED APPLICATIONS

The present application is the U.S. national stage of International Patent Application PCT/EP2016/056974 filed internationally on Mar. 30, 2016, which, in turn, claims priority to European Patent Application No. 15162763.5 filed on Apr. 8, 2015.

The invention relates to a vehicle antenna pane, a method for producing the vehicle antenna pane, and use thereof.

A system for navigation using the Global Navigation Satellite System (GNSS) is often integrated into modern vehicles. Systems in operation are, for example, the Global Positioning System (GPS) or the GLObal Navigation Satellite System (GLONASS). The antennas necessary for this can be arranged on the car body and thus outside the vehicle interior, as is known, for example, from U.S. 20140176374 A1. Such antennas are losing their appeal since they negatively affect the aesthetic appearance of the vehicle, can cause wind noise, and are susceptible to damage and vandalism.

Alternatively, GNSS antennas can be arranged within the vehicle interior, for example, below the dashboard or below the windshield. In this case, it is difficult to find a suitable position with a good antenna view of the GNSS satellites and, at the same time, to avoid EMC problems due to electrical devices in the dashboard and due to the vehicle engine. Furthermore, electrically conductive layers such as infrared reflecting layers or low-E layers can prevent the transmission of electromagnetic radiation through the pane and block the GNSS signal.

Typical GPS antennas are realized as planar antennas and, typically, as patch antennas, and are known, for example, from WO 00/22695 A1, DE 202006011919 U1, or DE 202010011837 U1. Here, a flat metallic antenna structure is arranged on one side of a printed circuit board or a ceramic carrier. A flat base plate is arranged on the opposite side as a grounding surface. The antenna structure and the base plate are connected to an electrical reception unit via electrical lines. Due to the material thickness of the printed circuit board or the ceramic carrier, in the case of an arrangement directly on the windshield, the antenna has a certain thickness and is clearly visible and not very aesthetic.

The object of the present invention consists in providing an improved vehicle antenna pane in which an antenna and, in particular, a GPS antenna can be integrated easily and economically.

The object of the present invention is accomplished according to the invention by a vehicle antenna pane in accordance with the independent claims. Preferred embodiments are disclosed in the subclaims.

The vehicle antenna pane according to the invention comprises at least the following features:
- an inner pane having an external surface (III) and an internal surface (IV),
- an outer pane having an external surface (I) and an internal surface (II),
- at least one intermediate layer, which connects the internal surface (II) of the outer pane areally to the external surface (III) of the inner pane,
- a planar antenna structure, which is arranged between the inner pane and the outer pane,
- a base plate, which is arranged on the interior side in relation to the antenna structure, wherein at least one dielectric with relative permittivity $\in_r$ is arranged between the antenna structure and the base plate, and the dielectric consists at least of the inner pane, of the intermediate layer, or of the inner pane and the intermediate layer, the antenna structure has a base with a ratio of length $l_A$ to width $b_A$ of 1:1 to 10:1, and the base plate is arranged at least in the region of the orthogonal projection of the antenna structure relative to the inner pane.

The base plate preferably serves as a grounding surface, i.e., it can be connected to the electrical ground reference of a vehicle.

The vehicle antenna pane according to the invention is suitable for separating a vehicle interior from external surroundings. It defines the internal surfaces (II,IV) of the vehicle antenna pane, which face the vehicle interior, as well as the external surfaces (I,III), which face away from the vehicle interior.

The antenna structure is a flat electrically conductive structure or layer. It is arranged between the inner pane and the outer pane. The base plate is also an electrically conductive structure or layer. It is arranged on the interior side in relation to the antenna structure. This means that the base plate is arranged closer to the vehicle interior than the antenna structure.

All electrically insulating substrates that are thermally and chemically stable as well as dimensionally stable under the conditions of the production and the use of the vehicle antenna pane according to the invention are basically suitable as an inner pane and an outer pane.

The inner pane and/or the outer pane preferably contain glass, particularly preferably flat glass, float glass, quartz glass, borosilicate glass, soda lime glass, or clear plastics, preferably rigid clear plastics, in particular polyethylene, polypropylene, polycarbonate, polymethylmethacrylate, polystyrene, polyamide, polyester, polyvinyl chloride, and/or mixtures thereof. The inner pane and/or the outer pane are preferably transparent, in particular for use of the vehicle antenna pane as a windshield or rear window of a vehicle or other uses where high light transmittance is desired. In the context of the invention, a pane that has transmittance greater than 70% in the visible spectral range is considered "transparent". For vehicle antenna panes that are not positioned within the traffic-relevant field of vision of the driver, for example, for roof panels, the transmittance can also be much lower, for example, greater than or equal to 5%.

The thickness of the inner pane and/or the outer pane can vary widely and thus be ideally adapted to the requirements of the individual case. Preferably, standard thicknesses of 1.0 mm to 25 mm, preferably from 1.4 mm to 2.5 mm, are used for vehicle glass. The size of the inner pane and/or the outer pane can vary widely and is governed by the size of the use according to the invention. The inner pane and/or the outer pane have, for example, in the automotive sector, customary areas from 200 cm$^2$ up to 3 m$^2$.

The vehicle antenna pane can have any three-dimensional shape. Preferably, the three-dimensional shape has no shadow zones, so it can, for example, be coated by cathodic sputtering. Preferably, the inner pane and the outer pane are flat or slightly curved in one or a plurality of spatial directions. In particular, flat panes are used. The panes can be colorless or colored.

The inner pane and/or the outer pane preferably have relative permittivity $\varepsilon_{r,1/2}$ from 2 to 8 and particularly preferably from 6 to 8. With such relative permittivities, it was possible to obtain particularly good antenna reception and transmission properties.

The inner pane and/or the outer pane are connected to one another by at least one intermediate layer. The intermediate layer is preferably transparent. The intermediate layer preferably contains at least one plastic, preferably polyvinyl butyral (PVB), ethylene vinyl acetate (EVA), and/or polyethylene terephthalate (PET). However, the intermediate layer can also, for example, contain polyurethane (PU), polypropylene (PP), polyacrylate, polyethylene (PE), polycarbonate (PC), polymethylmethacrylate, polyvinyl chloride, polyacetate resin, casting resins, acrylates, fluorinated ethylene propylene, polyvinyl fluoride, and/or ethylene tetrafluoroethylene, or copolymers or mixtures thereof. The intermediate layer can be formed by one or even by a plurality of films arranged one above another or side-by-side, wherein the thickness of a film is preferably from 0.025 mm to 1 mm, typically 0.38 mm or 0.76 mm. The intermediate layers can preferably be thermoplastic and, after lamination, can bond the inner pane and the outer pane and possible other intermediate layers to one another.

The intermediate layer preferably has relative permittivity $\varepsilon_{r,3}$ from 2 to 4 and particularly preferably from 2.1 to 2.9. With such relative permittivities, it was possible to obtain particularly good antenna properties.

At least one dielectric with relative permittivity $\varepsilon_r$ is arranged between the antenna structure and the base plate. Since the antenna structure is arranged between the inner pane and the outer pane, three preferred configurations arise.

The antenna structure is arranged between the outer pane and the intermediate layer. The base plate can then be arranged between the intermediate layer and the inner pane or on the internal surface (IV) of the inner pane. In the first case, the dielectric arranged between the antenna structure and the base plate contains or consists of the intermediate layer; in the second case, the dielectric contains or consists of the intermediate layer and the inner pane.

Alternatively, the antenna structure can be arranged between the intermediate layer and the inner pane. The base plate is then arranged on the internal surface (IV) of the inner pane. In this case, the dielectric contains or consists of the inner pane.

In all cases, the base plate is arranged at least in the region of the orthogonal projection of the antenna structure relative to the inner pane. This means that when looking through the vehicle antenna pane from the vehicle interior, i.e., at the internal surface (IV) of the vehicle antenna pane, only the base plate is visible and the base plate completely obscures the view of the antenna structure.

In an advantageous embodiment of the invention, the area of the base plate is greater than the area of the antenna structure, preferably greater by at least 10%, and particularly preferably greater by at least 25%. In another advantageous embodiment of the invention, the base plate protrudes, in the orthogonal projection of the antenna structure, beyond the periphery of the antenna structure by at least 2 mm in each case, preferably by at least 5 mm, and in particular, by at least 10 mm.

The antenna structure has a base with a ratio of length $l_A$ to width $b_A$ of 1:1 to 10:1, preferably of 1:1 to 2:1, and particularly preferably of 1:1 to 1.1:1. The base of the antenna structure is preferably a rectangle, a square, a trapezoid, a polygon with more than four corners, an ellipse, or a circle. In the case of a rectangle, the length $l_A$ corresponds to the length of the longer side of the rectangle and the width $b_A$ corresponds to the length of the shorter side of the rectangle. In the case of a square or substantially square base with equal side lengths, the length $l_A$ and the width $b_A$ consequently have a ratio of 1:1. In the case of a nonrectangular and, in particular, an elliptical structure, the length $l_A$ is determined by the maximum length of the structure and the width $b_A$ is determined by the length of the direction running orthogonal to the length $l_A$. In the case of a circular base, the length $l_A$ and the width $b_A$ have a ratio of 1:1.

In particular, with rectangular or square bases, in the context of the present invention, one, preferably two corners positioned diagonally opposite one another, and, particularly preferably, all corners can be beveled. Thus, the antenna structure can be advantageously tuned to the electromagnetic radiation to be received. The bevel advantageously amounts to less than 20% of the length $l_A$ and/or of the width $b_A$, preferably less than 10%.

The dimensions of the antenna structure depend, in general, on the desired frequency band and the respective use. For mobile communication in the frequency range from 0.8 GHz to 2.7 GHz, the antenna structure typically has a length $l_A$ and/or a width $b_A$ of 20 mm to 60 mm. For applications for satellite-supported navigation (GNSS) in the frequency range from 1.2 GHz to 1.7 GHz, the antenna structure typically has a length $l_A$ and/or a width $b_A$ of 30 mm to 40 mm.

In an advantageous embodiment of the invention, the antenna structure is optimized to a GPS signal with a frequency of 1575.42 MHz and a right circularly polarized electromagnetic plane of oscillation. For this, the antenna structure has a rectangular base with a length $l_A$ of 36 mm and a width $b_A$ of 34 mm and, consequently, a ratio of roughly 1.06:1.

The antenna structure can advantageously have other cutouts. Particularly advantageous is a slot-shaped cutout. In the case of a rectangular or square base of the antenna structure, the longer side of the slot-shaped cutout is preferably aligned parallel to and in particular along the diagonal of the base. The slot-shaped cutout has, for example, a rectangular shape, advantageously with a length $l_S$ of 5 mm to 20 mm, preferably of 7.5 mm to 12.5 mm, and a width $b_S$ of 0.5 mm to 5.0 mm, preferably of 0.9 mm to 3.1 mm.

Furthermore, the antenna structure can have rectangular cutouts that are arranged on both sides of the electrical line connection between the antenna structure and the signal line in the base of the antenna structure. These have the particular advantage that they enable particularly good coupling or decoupling of the antenna signal in or out of the antenna structure, which is then fed via the signal line of transmitting or receiving electronics.

In an advantageous embodiment of the invention, the antenna structure and/or the base plate is made of a printed and fired electrically conductive paste, preferably a silver-containing screen printing paste. The printed and fired electrically conductive paste advantageously has a thickness of 3 µm to 20 µm and a sheet resistance of 0.001 ohm/square to 0.03 ohm/square, preferably of 0.002 ohm/square to 0.018 ohm/square. Such antenna structures and base plates are easy to integrate into the industrial production process and to produce economically.

In another advantageous embodiment of the invention, the antenna structure and/or the base plate is made of an electrically conductive foil, preferably a metal foil and, in particular, a copper, silver, gold, or aluminum foil. It is understood that such foils can also be arranged on carrier films, for example, polymeric carrier films such as polyimide or polyethylene terephthalate (PET). Such antenna structures and base plates on carrier films are particularly advantageous since the entire antenna structure with the base plate can be made of one unit and can be conveniently and accurately placed in the later vehicle antenna pane during assembly.

In another advantageous embodiment of the invention, the antenna structure and/or the base plate is made of an electrically conductive structure that is electrically isolated out of an electrically conductive layer by a coating-free separation zone, in particular a coating-free separation line, from the surrounding layer. In an alternative embodiment of the invention, the separation zone is not completely coating-free but, instead, divided by a large number of intersecting separation lines into small regions electrically isolated from one another, which is also referred to in the following as a grid. The dimensions of the grid are selected such that the remaining electrically conductive layer does not interact with the incoming high-frequency electromagnetic radiation. Typically, the maximum distance between two adjacent separation lines is less than or equal to 3 mm.

The width of the separation zone for completely coating-free separation zones and a gridded separation zone is greater than or equal to 5 mm, preferably greater than or equal to $\lambda/\sqrt{\varepsilon_{\mathit{eff}}}$, where $\lambda$ is the wavelength of the electromagnetic radiation for which the antenna structure is optimized and $\varepsilon_{\mathit{eff}}$ is the effective permittivity of the dielectric surrounding the antenna structure and/or the base plate. For an antenna structure optimized to GNSS systems, the width is from 50 mm to 90 mm and, in particular, roughly 70 mm.

Such antenna structures and base plates are particularly advantageous when electrically conductive layers are already arranged in the pane, as is customary, for example, with electrically heatable panes and panes with an integrated filter for solar radiation. Here, the totally coating-free separation zone or the grid of the electrically conductive layer can be selected minimally without effectively restricting the number of visible satellites (or without restricting the spatial angle of the antenna), in contrast to antennas that are integrated into the dashboard.

In an advantageous embodiment of the vehicle antenna pane according to the invention, the width of the separation lines is from 30 μm to 200 μm and preferably from 70 μm to 140 μm. Such thin separation lines permit reliable and adequately high electrical insulation and, at the same time, disturb the view through the vehicle antenna pane only slightly or not at all.

Electrically conductive layers according to the invention are known, for example, from DE 20 2008 017 611 U1, EP 0 847 965 B1, or WO2012/052315 A1. They typically include one or a plurality of, for example, two, three, or four, electrically conductive, functional layers. The functional layers preferably contain at least one metal, for example, silver, gold, copper, nickel, and/or chromium, or a metal alloy. The functional layers particularly preferably contain at least 90 wt.-% of the metal, in particular at least 99.9 wt.-% of the metal. The functional layers can be made of the metal or the metal alloy. The functional layers particularly preferably contain silver or a silver-containing alloy. Such functional layers have particularly advantageous electrical conductivity with simultaneous high transmittance in the visible spectral range. The thickness of a functional layer is preferably from 5 nm to 50 nm, particularly preferably from 8 nm to 25 nm. In this range for the thickness of the functional layer, advantageously high transmittance in the visible spectral range and particularly advantageous electrical conductivity are achieved.

Typically, at least one dielectric layer is, in each case, arranged between two adjacent functional layers. Preferably, another dielectric layer is arranged below the first and/or above the last functional layer. A dielectric layer includes at least one individual layer made of a dielectric material, for example, containing a nitride such as silicon nitride or an oxide such as aluminum oxide. However, the dielectric layers can, in each case, also include a plurality of individual layers, for example, individual layers of a dielectric material, smoothing layers, adaptation layers, blocker layers, and/or antireflection layers. The thickness of a dielectric layer is, for example, from 10 nm to 200 nm.

This layered structure is generally obtained by a sequence of deposition operations which are performed by a vacuum process such as magnetic field enhanced cathodic sputtering.

Other suitable electrically conductive layers preferably contain indium tin oxide (ITO), fluorine-doped tin oxide ($SnO_2$:F), or aluminum-doped zinc oxide (ZnO:Al).

The electrically conductive layer can, in principle, be any coating that can be electrically contacted. If the pane according to the invention is intended to enable vision through it, as is the case with panes in the window sector, the electrically conductive layer is preferably transparent. In an advantageous embodiment, the electrically conductive layer is a layer or a layer structure of a plurality of individual layers with a total thickness less than or equal to 2 μm, particularly preferably less than or equal to 1 μm.

An advantageous transparent electrically conductive layer according to the invention has a sheet resistance of 0.4 ohm/square to 200 ohm/square. In a particularly preferred embodiment, the electrically conductive layer according to the invention has a sheet resistance of 0.5 ohm/square to 20 ohm/square. Coatings with such sheet resistances are particularly well-suited for the heating of vehicle window panes with typical on-board voltages of 12 V to 48 V or in the case of electric vehicles, with typical on-board voltages of up to 500 V.

In an advantageous embodiment of a composite pane according to the invention, the electrically conductive layer is arranged away from the edge of the composite pane by a width of 2 mm to 50 mm, preferably of 5 mm to 20 mm. The electrically conductive layer then has no contact with the atmosphere and, in the interior of the vehicle antenna pane, is advantageously protected by the intermediate layers against damage and corrosion.

The electrically conductive layer preferably includes a transparent, electrically conductive coating. Here, "transparent" means permeable to electromagnetic radiation of a wavelength from 300 nm to 1,300 nm and in particular to visible light.

If it is unnecessary for the electrically conductive layer to be designed transparent since the antenna structure and/or the base plate is arranged in a region of the vehicle antenna pane in which, for example, vision through the pane is prevented by a blockout print or a plastic housing, the electrically conductive layer can also be designed significantly thicker than with transparent electrically conductive layers. Such thicker layers can have a significantly lower sheet resistance. An electrically conductive foil, preferably a metal foil, and in particular a copper, silver, gold or aluminum foil, would, for example, be advantageous. The electrically conductive foil advantageously has a thickness of 50 μm to 1000 μm and preferably of 100 μm to 600 μm. The electrically conductive foil advantageously has conductivity of $1*10^6$ S/m to $10*10^7$ S/m and preferably of $3.5*10^7$ S/m to $6.5*10^7$ S/m.

It is understood that the antenna structure and the base plate from the embodiments mentioned, such as printed paste, electrically conductive foil, and divided electrically conductive layer, can be combined with one another. In other words, the antenna structure is made, for example, from an electrically conductive foil and the base plate is made of a printed paste, etc.

In an advantageous embodiment of the vehicle antenna pane according to the invention, the antenna structure and the base plate are arranged on the outer edge of the pane. In this case, the maximum distance to the outer edge is preferably less than 20 cm, particularly preferably less than 10 cm. This allows concealing the antenna structure, the base plate, and feed lines under a visually inconspicuous black imprint or with a covering, for example, a camera housing.

In another advantageous embodiment of the vehicle antenna pane according to the invention, the antenna foot point of the antenna structure is guided via a flat conductor to the edge of the vehicle antenna pane and out of it. The flat conductor is implemented, at least in a region that can be arranged adjacent a vehicle body, as a strip conductor and preferably as a coplanar strip conductor, whose signal line is electrically conductively coupled with the antenna structure and whose shield is electrically conductively coupled with the base plate. Here, "electrically conductively coupled" preferably means "galvanically coupled". Alternatively, the coupling can also be capacitive.

In another advantageous embodiment of the vehicle antenna pane according to the invention, the antenna structure and the signal line of the strip conductor and/or the base plate and the shield of the strip conductor are implemented in one piece. This avoids conduction losses at transitions between various sections of the antenna. Furthermore, such a one-piece structure is particularly simple to produce when the respective elements are arranged on a common carrier film.

The strip conductor is preferably implemented as a foil conductor or a flexibler foil conductor (flat conductor, flat ribbon conductor). The term "foil conductor" means an electrical conductor whose width is significantly greater than its thickness. Such a foil conductor is, for example, a strip or band containing or made of copper, tinned copper, aluminum, silver, gold, or alloys thereof. The foil conductor has, for example, a width of 2 mm to 16 mm and a thickness of 0.03 mm to 0.1 mm. The foil conductor can have an insulating, preferably polymeric sheathing, polyimide-based, for example. Foil conductors that are suitable for the contacting of electrically conductive coatings in panes have a total thickness of, for example, only 0.3 mm. Such thin foil conductors can be embedded without difficulty between the individual panes in the thermoplastic intermediate layer. Multiple conductive layers, electrically isolated from each other can be situated in one foil conductor strip.

Alternatively, thin metal wires can also be used as an electrical feed line. The metal wires contain in particular copper, tungsten, gold, silver, or aluminum or alloys of at least two of these metals. The alloys can also contain molybdenum, rhenium, osmium, iridium, palladium, or platinum.

The electrical line connection between the antenna structure and the electrical feed line and/or the base plate and the ground lead or shield is preferably done via electrically conductive adhesives or via a solder joint, which enable a reliable and durable electrical line connection between the connection region and the feed line. Alternatively, the electrical line connection can also be done by clamping since the clamp connection is unslippably fixed by the lamination operation. Alternatively, the feed line can also be printed overlappingly on the connection region, for example, using a metal-containing and, in particular, silver-containing, electrically conductive printing paste. Alternatively, the electrical line connection can also be produced by soldering.

In another advantageous embodiment of the vehicle antenna pane according to the invention, the base plate has a grounding region and a capacitive coupling region for the capacitive decoupling of the antenna signal. The antenna signal is capacitively coupled to a capacitive coupling region in the plane of the base plate through the dielectric between the antenna structure and the base plate plane. The capacitive coupling region is then connected to a region of the signal line of the foil conductor or is identical thereto. This is particularly advantageous since the electrical feed lines for the antenna signal and the ground or shield can be produced in a simple manner on one plane with a single strip conductor. The antenna structure in the interior of the vehicle antenna pane does not have to be contacted separately and no separate conductor has to be guided out from the vehicle antenna pane, which reduces sealing and corrosion problems on the pane edge.

In another advantageous embodiment of the vehicle antenna pane according to the invention, the intermediate layer in the immediate region between the antenna structure and the base plate is made of a dielectric with relative permittivity $\varepsilon_{r,3'}$ that is greater than the relative permittivity $\varepsilon_{r,3}$ of the dielectric of the intermediate layer in the surrounding region. Preferably, $\varepsilon_{r,3'} > 3*\varepsilon_{r,3}$. This has the particular advantage that the reception and transmission properties of the antenna can be more easily adapted to the respective requirements.

In another advantageous embodiment of the vehicle antenna pane according to the invention, the antenna structure, the flat conductor, and/or the base plate is arranged on a carrier film. The carrier film preferably contains a polymer and particularly preferably contains or is made of polyimide or polyethylene terephthalate (PET). The carrier film has relative permittivity of 2 to 4 and particularly preferably of 2.7 to 3.3. Depending on the arrangement of the carrier film relative to the antenna structure and base plate, the carrier film can also serve as an intermediately positioned dielectric and selectively influence the antenna properties.

The invention also concerns a vehicle antenna pane arrangement, which comprises a vehicle antenna pane according to the invention implemented as described above as well as receiving or transmitting electronics, which are electrically coupled with the antenna structure and the base plate. Here, the vehicle antenna pane is arranged as glazing in a vehicle body. The base plate preferably serves as a grounding surface, with the base plate being connected in this case to an electrical ground reference of the vehicle.

The various designs and embodiments of the vehicle antenna pane according to the invention described above can be implemented alone or in any combination.

Another aspect of the invention includes a method for producing a vehicle antenna pane, in particular a vehicle antenna pane according to the invention implemented as described above, at least comprising:
  (a) producing a stack sequence of an inner pane, at least one intermediate layer, and one outer pane, wherein a planar antenna structure is arranged between the inner pane and the outer pane and a base plate is arranged on the interior side in relation to the antenna structure, and
  (b) laminating the stack sequence to form a vehicle antenna pane.

The lamination, i.e., the bonding of the inner pane and the outer pane via the intermediate layer in process step (b) is preferably done under the action of heat, vacuum, and/or pressure. Methods known per se for producing a composite pane can be used.

For example, so-called "autoclave methods" can be performed at an elevated pressure of roughly 10 bar to 15 bar and temperatures from 130° C. to 145° C. for roughly 2 hours. Vacuum bag or vacuum ring methods known per se operate, for example, at roughly 200 mbar and 80° C. to 110° C. The inner pane, the thermoplastic intermediate layer, and the outer pane can also be pressed in a calendar between at least one pair of rollers to form a pane. Systems of this type for producing panes are known and normally have at least one heating tunnel upstream from a pressing unit. The temperature during the pressing operation is, for example, from 40° C. to 150° C. Combinations of calendar and autoclave methods have proved particularly valuable in practice. Alternatively, vacuum laminators can be used. These consist of one or a plurality of heatable and evacuable chambers, in which the inner pane and the outer pane are laminated within, for example, roughly 60 minutes at reduced pressures from 0.01 mbar to 800 mbar and temperatures from 80° C. to 170° C.

Another aspect of the invention includes the use of the vehicle antenna pane according to the invention in means of transportation for travel on land, in the air, or on water, in particular in trains, watercraft, and motor vehicles, for example, as a windshield, rear window, side window, and/or roof panel.

The invention further includes the use of the vehicle antenna pane according to the invention for reception of GPS signals for satellite-supported navigation.

In the following, the invention is explained in detail with reference to drawings and exemplary embodiments. The drawings are schematic depictions and not true to scale. The drawings in no way restrict the invention.

Figure 1B:
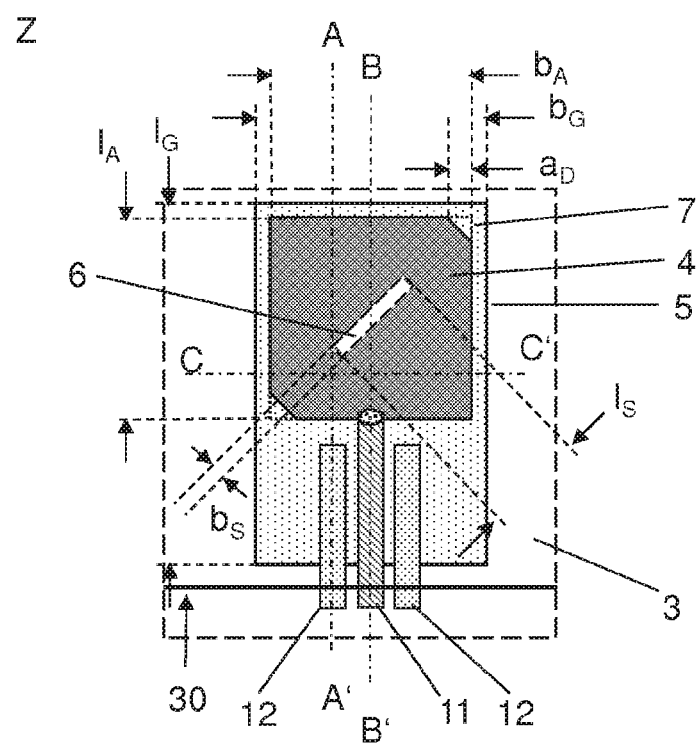
Figure 1C:
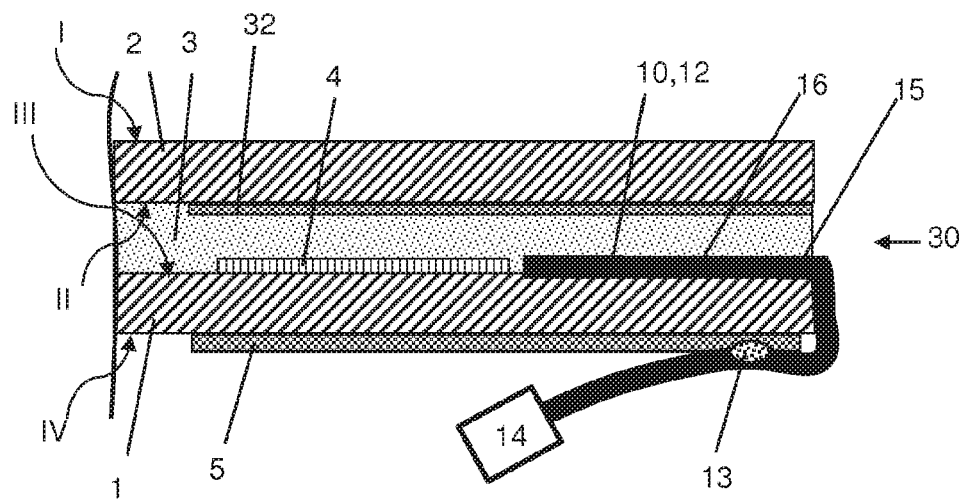
Figure 1D:
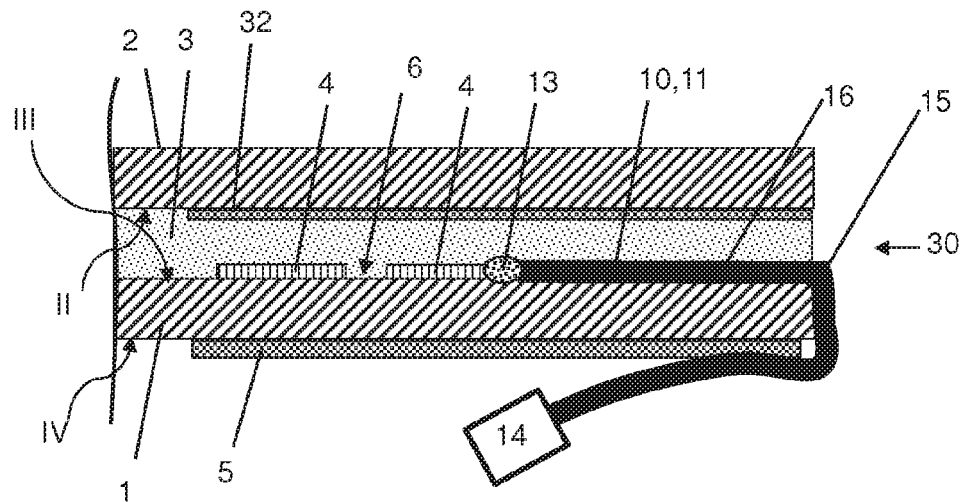
Figure 1E:
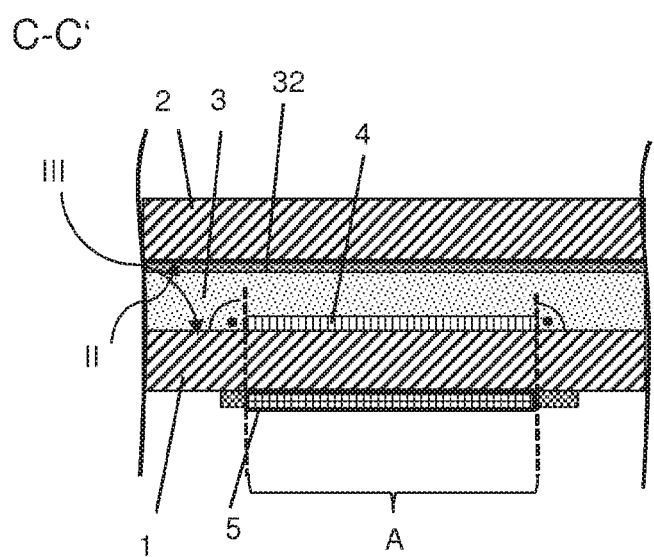
Figure 2A:
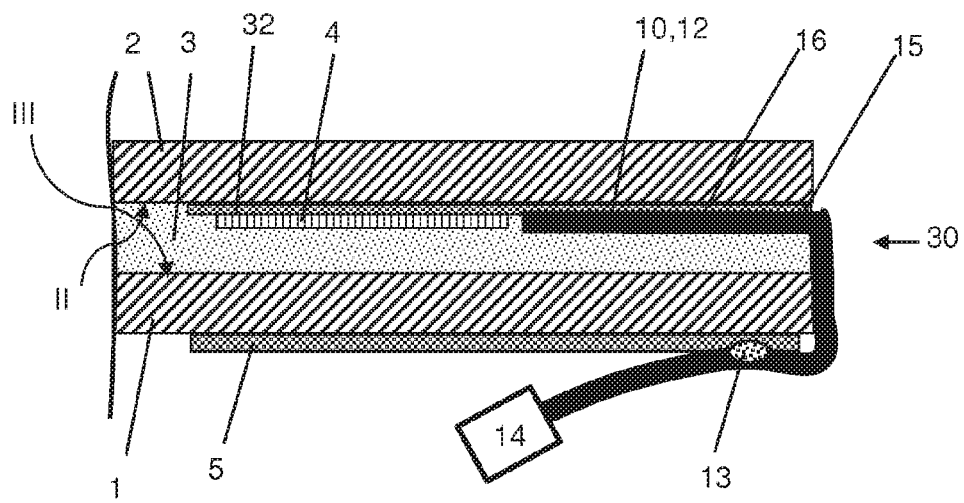
Figure 2B:
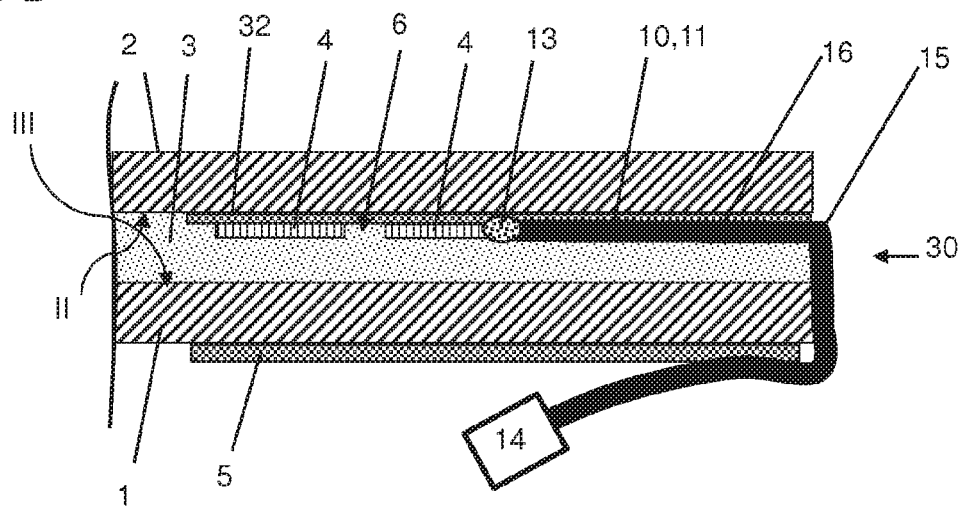
Figure 3A:
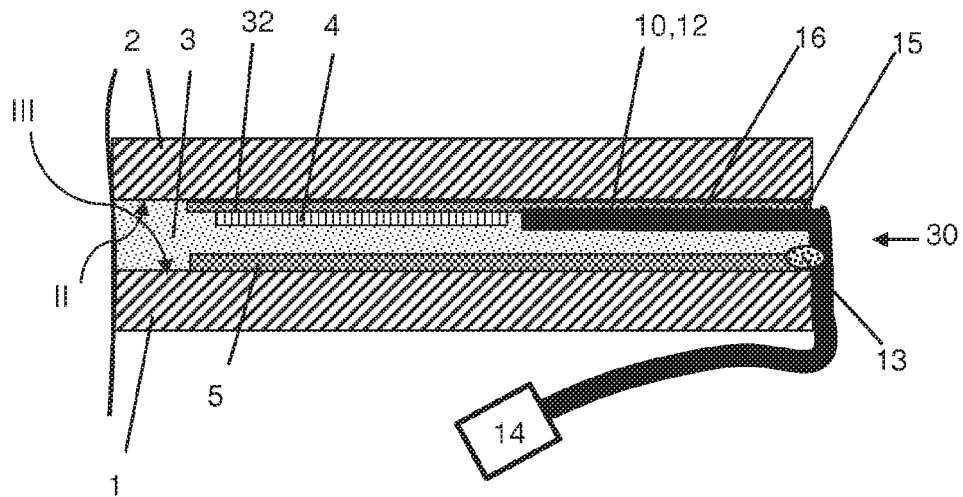
Figure 3B:
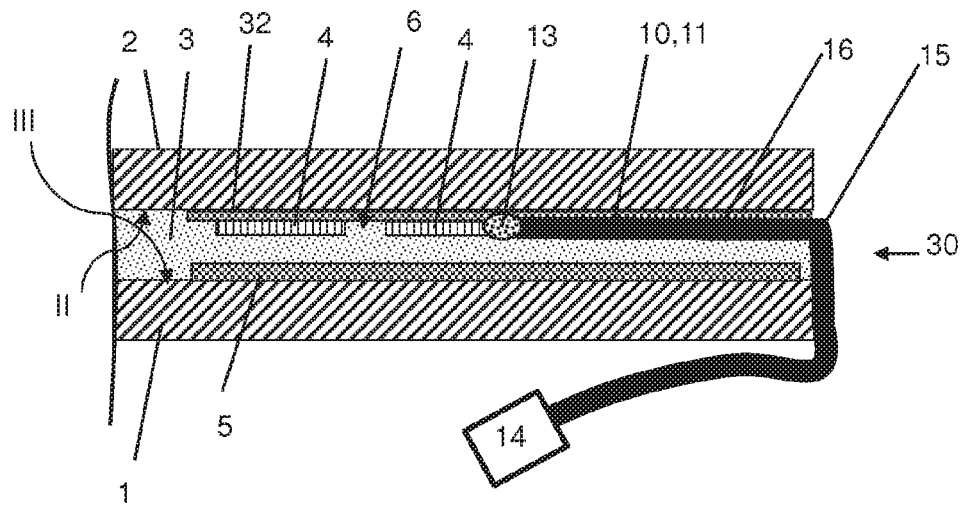
Figure 4A:
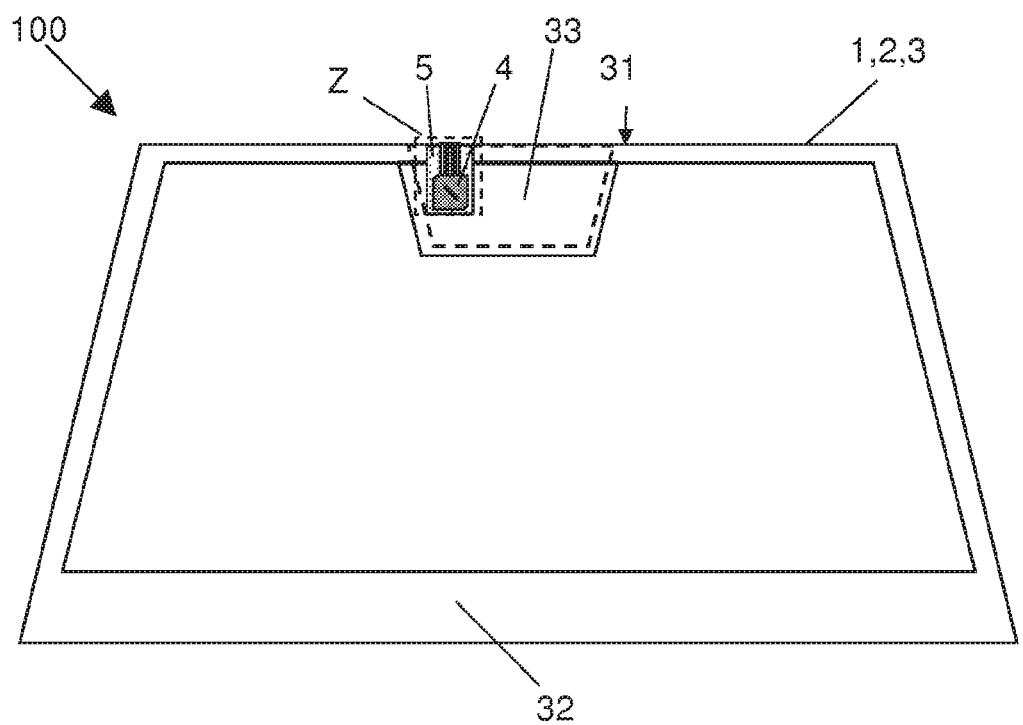
Figure 4B:
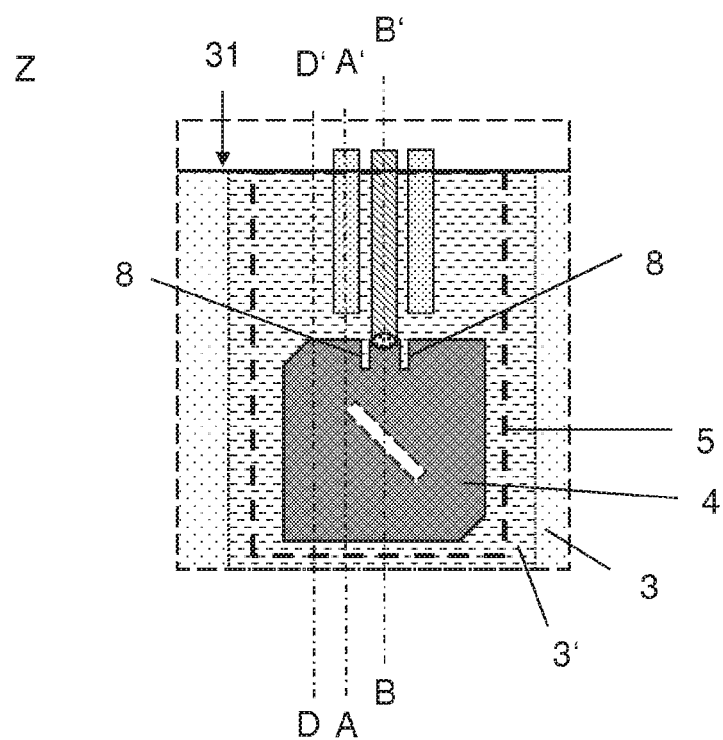
Figure 4C:
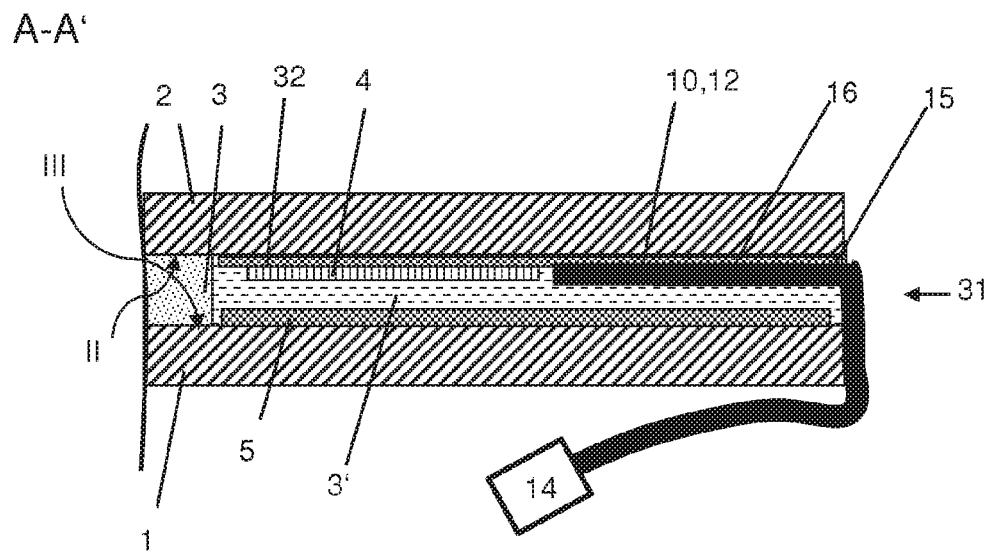
Figure 4D:
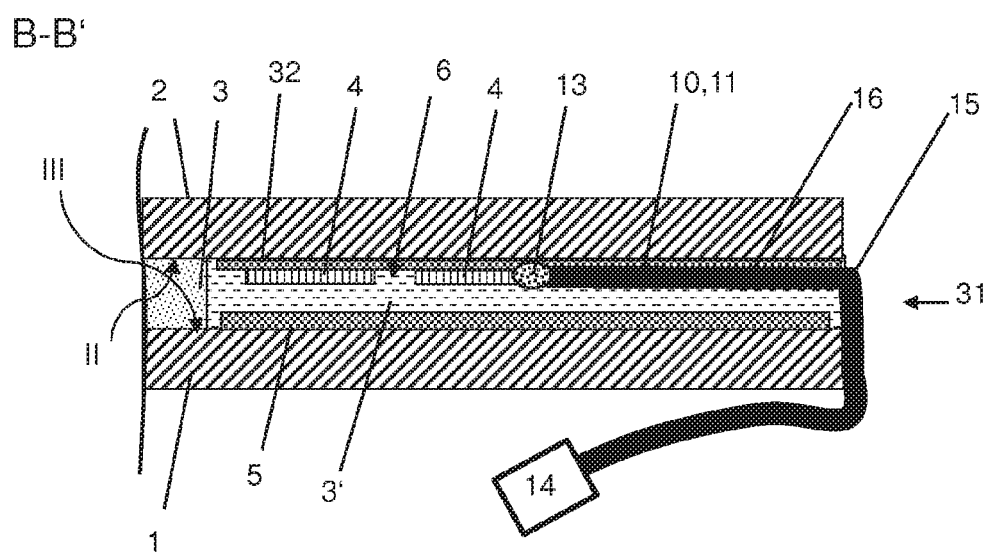
Figure 4E:
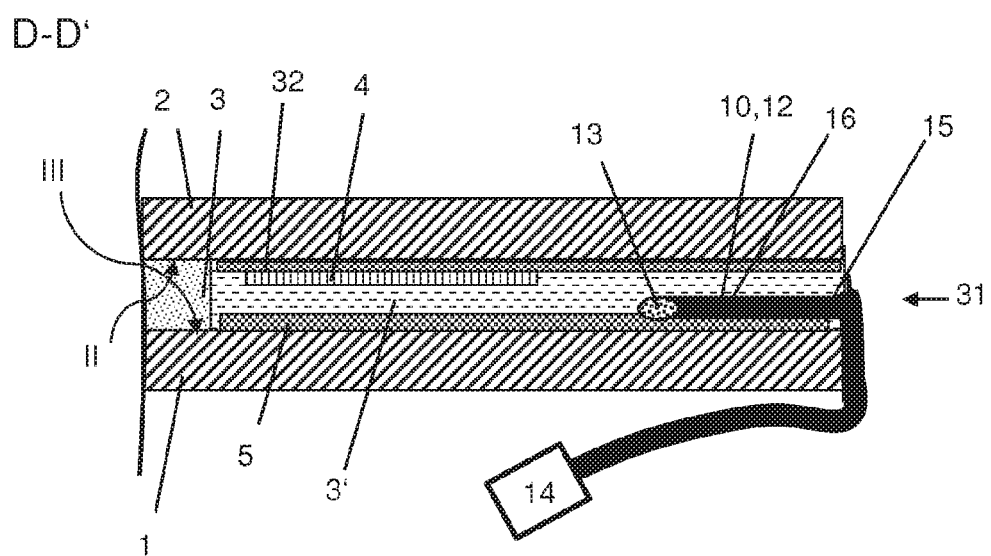
Figure 5:
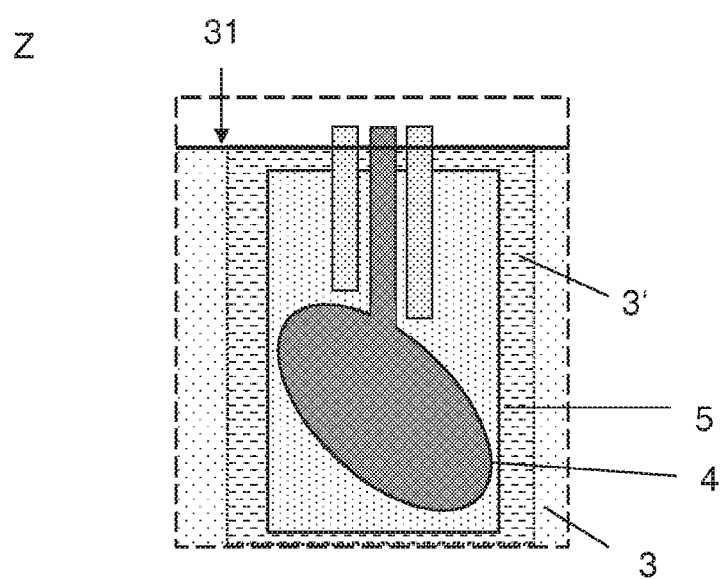
Figure 6A:
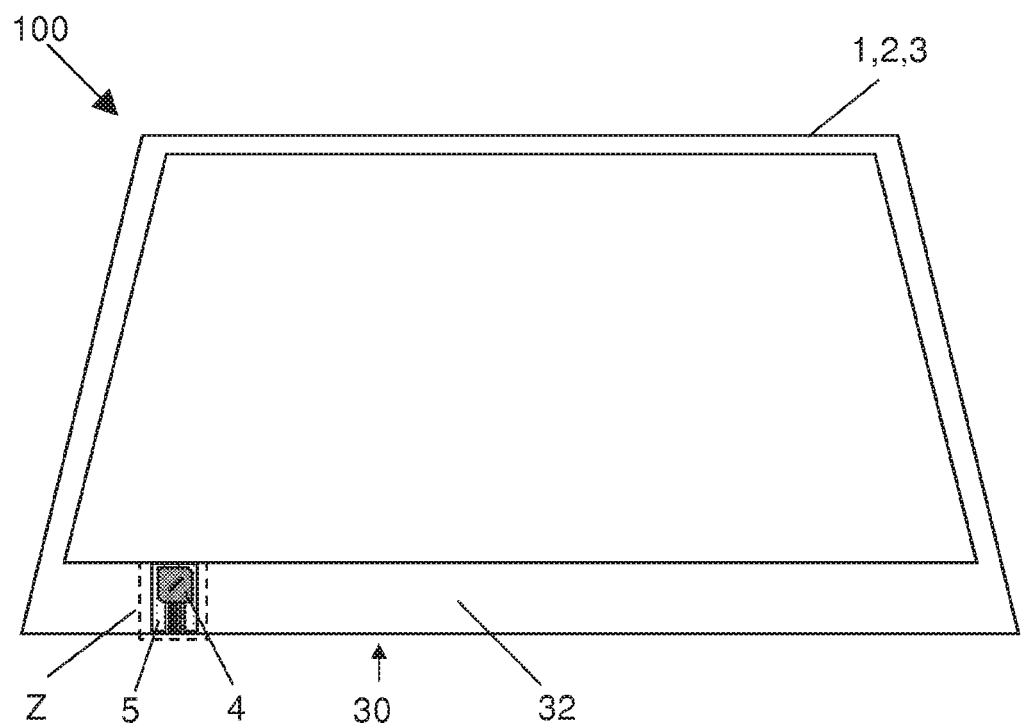
Figure 6B:
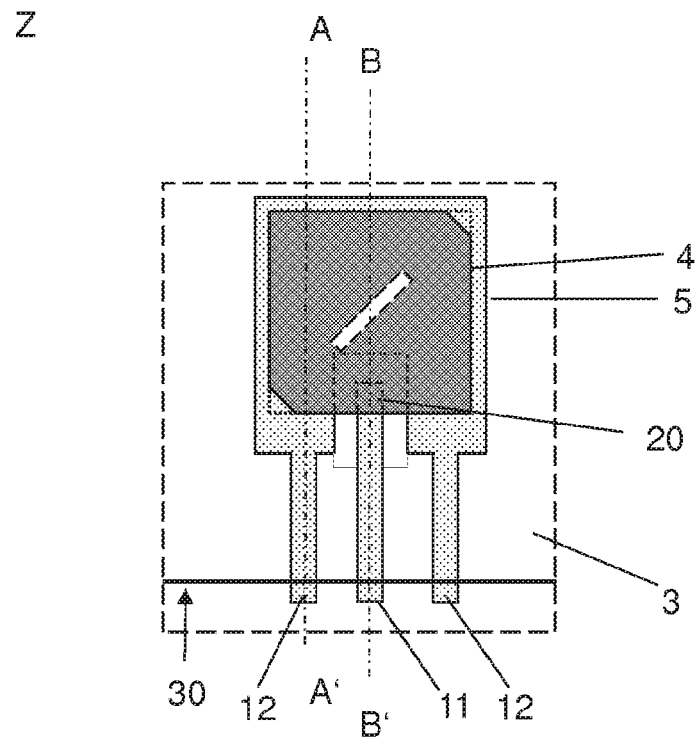
Figure 6C:
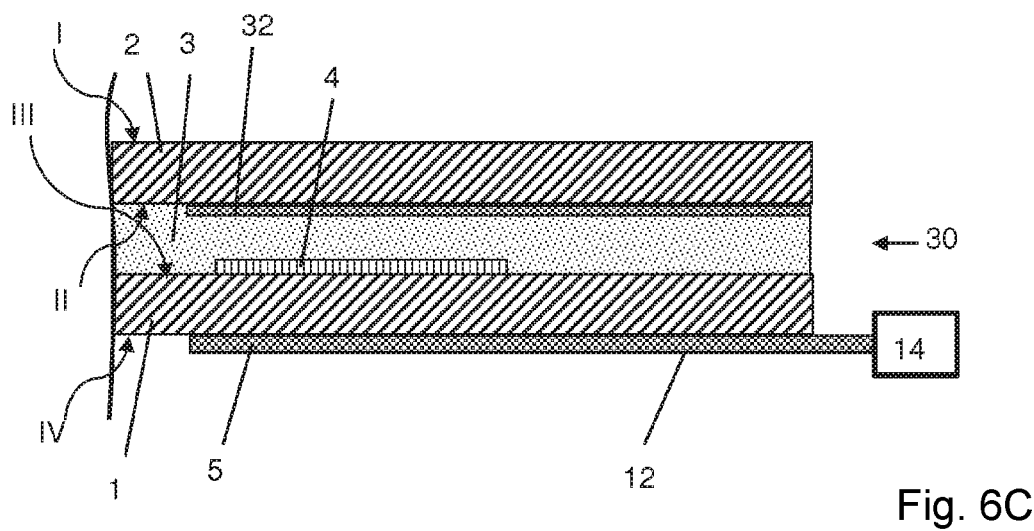
Figure 6D:
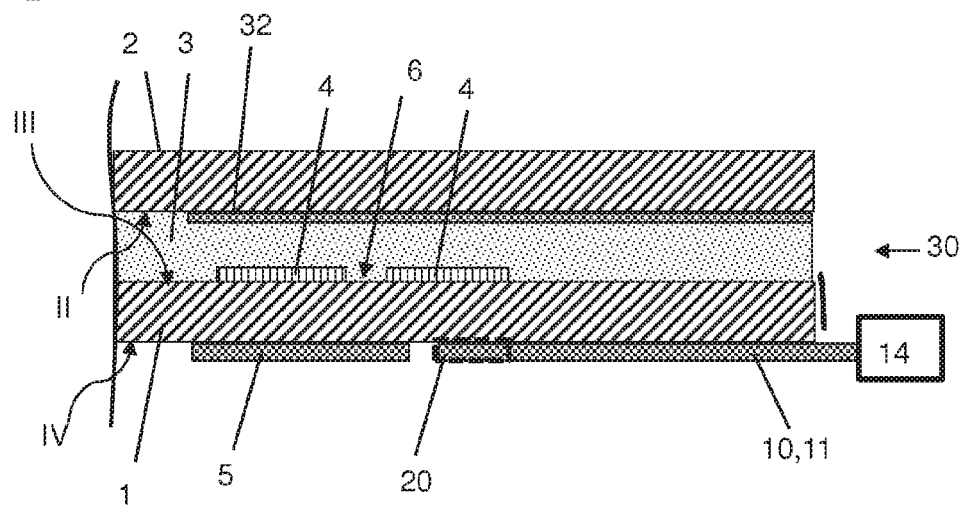
Figure 8:
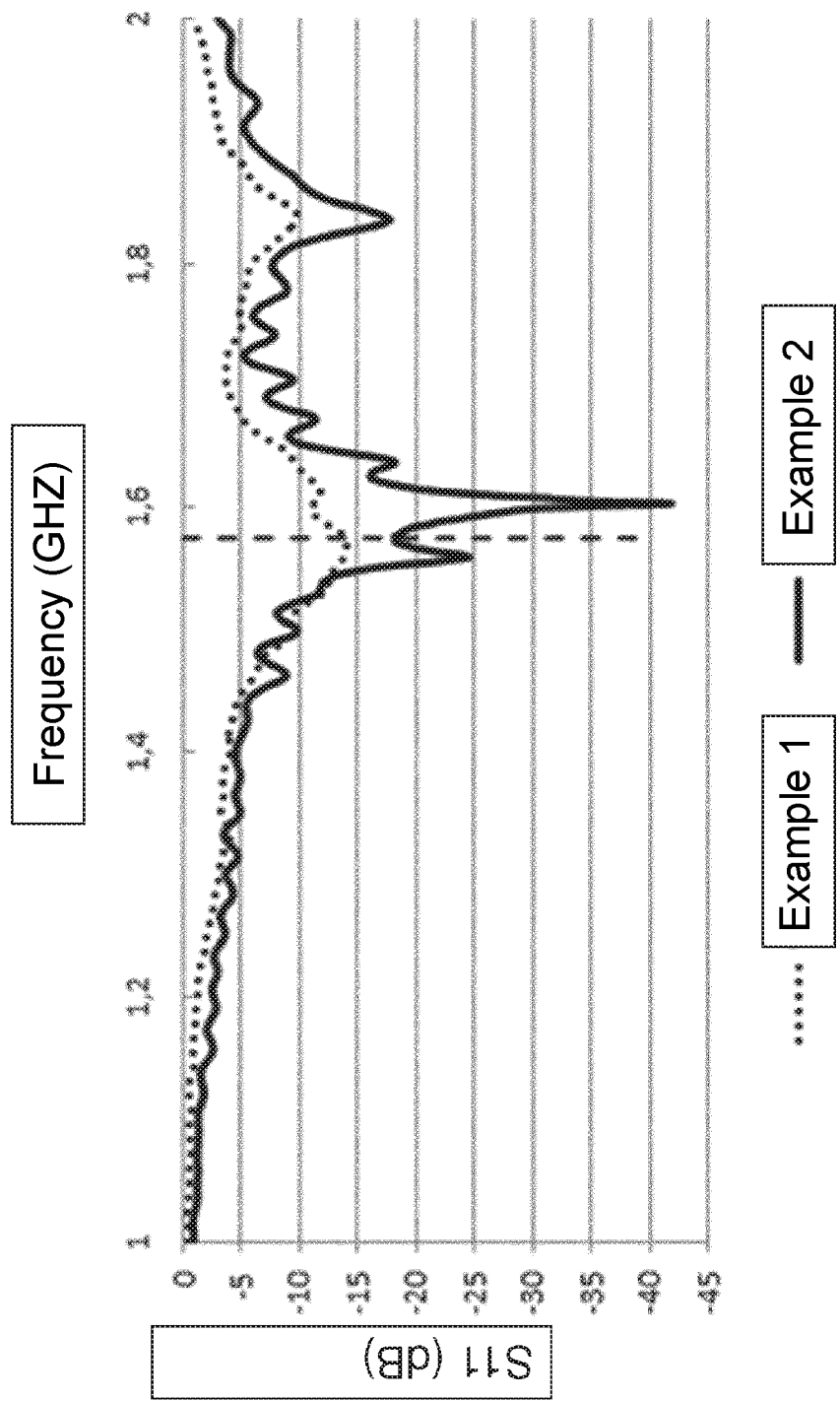

They depict:

FIG. 1A a plan view of an embodiment of a vehicle antenna pane according to the invention, FIG. 1B an enlarged representation of the detail Z of FIG. 1A, FIG. 1C a cross-sectional view along the section line A-A' of FIG. 1B, FIG. 1D a cross-sectional view along the section line B-B' of FIG. 1B, FIG. 1E a cross-sectional view along the section line C-C' of FIG. 1B, FIG. 2A a cross-sectional view along the section line A-A' of an alternative exemplary embodiment of FIG. 1B, FIG. 2B a cross-sectional view along the section line B-B' of an alternative exemplary embodiment of FIG. 1B, FIG. 3A a cross-sectional view along the section line A-A' of another alternative exemplary embodiment of FIG. 1B, FIG. 3B a cross-sectional view along the section line B-B' of another alternative exemplary embodiment of FIG. 1B, FIG. 4A a plan view of another alternative embodiment of a vehicle antenna pane according to the invention, FIG. 4B an enlarged representation of the detail Z of FIG. 4A, FIG. 4C a cross-sectional view along the section line A-A' of FIG. 4B, FIG. 4D a cross-sectional view along the section line B-B' of FIG. 4B, FIG. 4E a cross-sectional view along the section line D-D' of FIG. 4B, FIG. 5 an enlarged representation of a detail Z of FIG. 4A with an alternative embodiment of an antenna structure according to the invention, FIG. 6A a plan view of another alternative embodiment of a vehicle antenna pane according to the invention, FIG. 6B an enlarged representation of the detail Z of FIG. 6A, FIG. 6C a cross-sectional view along the section line A-A' of FIG. 6B, FIG. 6D a cross-sectional view along the section line B-B' of FIG. 6B;

FIG. 7 a detailed flowchart of an embodiment of the method according to the invention;

FIG. 8 a measurement of the so-called $S_{11}$ parameter on a vehicle antenna pane according to the invention.

FIG. 1A depicts a plan view of an exemplary embodiment of a vehicle antenna pane 100 according to the invention.

FIG. 1B depicts an enlarged representation of the detail Z of the vehicle antenna pane 100 according to the invention of FIG. 1A. Here, the vehicle antenna pane 100 comprises, for example, an inner pane 1 and an outer pane 2, which are connected to one another via an intermediate layer 3. The vehicle antenna pane 100 is, for example, the windshield of a passenger car. The dimensions of the vehicle antenna pane 100 are, for example, 0.9 m×1.5 m.

The inner pane 1 is, for example, intended to face the interior in the installed position. In other words, the internal surface IV of the inner pane 1 is accessible from the interior out, whereas, in contrast, the external surface I of the outer pane 2 faces outward relative to the vehicle interior. The inner pane 1 and the outer pane 2 are made, for example, of soda lime glass. The thickness of the inner pane 1 is, for example, 1.6 mm and the thickness of the outer pane 2 is 2.1 mm. It is understood that the inner pane 1 and the outer pane 2, for example, also can be implemented with the same thickness. The intermediate layer 3 is a thermoplastic intermediate layer and is made, for example, of polyvinyl butyral (PVB). It has a thickness of 0.76 mm auf.

The view shown is a plan view of the external surface I of the outer pane 2 viewed from outside the vehicle.

FIG. 1C depicts a cross-sectional view along the section line A-A' of FIG. 1B. FIG. 1D depicts a corresponding cross-sectional view along the section line B-B' of FIG. 1B.

The antenna structure 4 and the base plate 5 are arranged on the lower pane edge 30 of the vehicle antenna pane 100. The antenna structure 4 consists in this example of a 0.1-mm-thick copper foil which is arranged on the external surface III of the inner pane 1. The antenna structure 4 consists in this example of a rectangular base with a length $l_A$ of 36 mm and a width $b_A$ also of 34 mm. The base of the antenna structure 4 has, in each case, on two opposite corners a triangular cutout 7, where, in each case, one of the corners of the square is removed. The triangular cutout 7 is, for example, an isosceles right triangle with a leg length of $a_D$=2.5 mm. The antenna structure 4 additionally has a slot-shaped cutout 6 with a rectangular shape and with a length $l_S$ of 9.5 mm and a width $b_S$ of 3 mm. The slot-shaped cutout 6 is arranged with its length along the diagonal of the square base on which the triangular cutouts 7 are situated.

The antenna structure 4 is connected via an electrical line connection 13 to the signal line 11 of a foil conductor 10. The electrical line connection 13 is, for example, a solder point or an electrically conductive adhesive. The foil conductor 10 is implemented at least in the region of the pane edge 30 and here, for example, over its full length as a coplanar strip conductor. In other words, the planar signal line 11 is surrounded by two flat shields 12 or shielded leads arranged in a plane with signal line 11. The foil conductor 10 thus consists of three inner conductors 15, namely, the signal line 11 and two shields 12, which are surrounded, for example, on one side and preferably on both sides by electrical insulation 16. The electrical insulation 16 is, for example, a polymeric film and, in particular, a polyimide film. The inner conductor 15 is, for example, an aluminum foil with a width of 4 mm and a thickness of 200 μm. The foil conductor 10 is guided around the pane edge 30. The two shields 12 are electrically connected on the internal surface IV of the inner pane 1 to the base plate 5 via an electrical line connection 13. The electrical line connection 13 is, for example, a solder point or an electrically conductive adhesive. Moreover, the foil conductor 10 has a connection element 14, for example, a coaxial SMA (subminiature A) plug for the connection to reception or transmission electronics and, here, in particular to GPS reception electronics.

The base plate 5 has a rectangular base with a width $b_G$ of 6 cm and a length $l_G$ of 13 cm. The base plate 5 protrudes beyond the region of the orthogonal projection of the antenna structure 4 relative to the inner pane 1. The base plate 5 is offset by a distance of roughly 20 mm from the pane edge 30 into the pane interior.

FIG. 1E depicts a cross-sectional view along the section line C-C' of FIG. 1B. The orthogonal projection of the antenna structure 4 extends over the surface A on the internal surface IV of the inner pane 1. The base plate 5 protrudes completely beyond the surface A of the orthogonal projection of the antenna structure 4.

The square base of the antenna structure 4 is arranged with one side edge parallel to the pane edge 30. It is understood that the side edge can even have a certain angle relative to the pane edge 30, for example, 45°. The signal line 11 is connected to the antenna structure 4 on the side edge of the antenna structure 4 directly adjacent the side edge 30. The slot-shaped cutout 6 and the diagonal with the triangular cutouts 7 run, viewed from the connection point of the signal line 11, from the bottom left to the top right.

The antenna structure 4 depicted is suitable to receive a right circularly polarized GPS signal with an L1 frequency of 1575.42 MHz. The antenna structure 4 depicted is also suited to obtain good GLONASS reception.

The antenna structure 4 and the base plate 5 are arranged in a region of the vehicle antenna pane 100 in which a blockout print 32 in the form a black print is arranged on the internal surface II of the outer pane 2. The blockout print 32 is impermeable to visible light and prevents viewing the gluing in of the vehicle antenna pane 100 in a motor vehicle body or the antenna structure 4 or the base plate 5. The blockout print 32 is permeable to electromagnetic radiation in the frequency range of the antenna that is formed by the antenna structure 4 and the base plate 5. The action of the antenna is non-substantially affected by the blockout print 32, or not at all.

FIG. 2A depicts a cross-sectional view along the section line A-A' of an alternative exemplary embodiment of FIG. 1B. FIG. 2B depicts a cross-sectional view along the section line B-B' of an alternative exemplary embodiment of FIG. 1B.

FIGS. 2A and 2B differ from FIGS. 1 C and 1 D only in the arrangement of the antenna structure 4. In this exemplary embodiment, the antenna structure 4 is arranged between the outer pane 2 and the intermediate layer 3. The dielectric between the antenna structure 4 and the base plate 5 is formed by the intermediate layer 3 and the inner pane 1 between the antenna structure 4 and the base plate 5. The foil conductor 10 runs in the inside of the vehicle antenna pane 100 between the outer pane 2 and the intermediate layer 3. The other features of the embodiment correspond to the description regarding FIG. 1A to 1E.

FIG. 3A depicts a cross-sectional view along the section line A-A' of another alternative exemplary embodiment of FIG. 1B. FIG. 3B depicts a cross-sectional view along the section line B-B' of another alternative exemplary embodiment of FIG. 1B.

FIGS. 3A and 3B differ from FIGS. 2A and 2B only in the arrangement of the base plate 5. In this exemplary embodiment, the antenna structure 4 is arranged between the outer pane 2 and the intermediate layer 3. The base plate 5 is arranged between the intermediate layer 3 and the inner pane 1. The dielectric between the antenna structure 4 and the base plate 5 is formed by the region of the intermediate layer 3 between the antenna structure 4 and the base plate 5. The signal line 11 and the shield 12 run in the inside of the vehicle antenna pane 100 between the outer pane 2 and the intermediate layer 3, with the shield 12 contacting the base plate 5 likewise in the inside of the vehicle antenna pane 100 or on the pane edge 30 via an electrical line connection 13. An electrical line connection 13, which is arranged in the inside of the vehicle antenna pane 100, is, for example, depicted in detail in FIG. 4E. The other features of the embodiment correspond to the description regarding FIG. 1A to 1E.

FIG. 4A depicts a plan view of another alternative embodiment of a vehicle antenna pane 100 according to the invention. FIG. 4B depicts an enlarged representation of the detail Z of FIG. 4A. FIG. 4C depicts a cross-sectional view along the section line A-A' of FIG. 4B. FIG. 4D depicts a cross-sectional view along the section line B-B' of FIG. 4B. FIG. 4E depicts a cross-sectional view along the section line B-B' of FIG. 4B.

The vehicle antenna pane 100 of FIG. 4A corresponds substantially in material and arrangement to the vehicle antenna pane 100 of FIG. 1A such that, in the following, only the differences between the vehicle antenna panes 100 are examined in detail. In contrast to FIG. 1A, the antenna structure 4 and the base plate 5 are arranged at the upper side edge 31 of the vehicle antenna pane 100. The antenna structure 4 and the base plate 5 are arranged here in a region of a communication window 33. Other sensors such as a rain sensor or a camera are, for example, arranged in the region of the communication window 33. The region of the communication window 33 is covered on the vehicle interior side by a plastic housing (not shown here), within which, preferably, the sensors are arranged. The antenna structure 4 and the base plate 5 correspond in their materials and dimensions to the antenna structure 4 and base plate 5 of the exemplary embodiments of FIGS. 3A and 3B. In contrast to FIGS. 3A and 3B, the intermediate layer 3 is not homogeneous over the complete vehicle antenna pane 100, but is, instead, divided into two subregions. An intermediate layer 3' made of a material with relative permittivity $\varepsilon_{r,3'}$ that is greater than the relative permittivity $\varepsilon_{r,3}$ of the dielectric of the intermediate layer 3 in the surrounding region is between the antenna structure 4 and the base plate 5. The antenna structure 4 is, consequently, arranged between the outer pane 2 and the region of the intermediate layer 3'. The base plate 5 is arranged between the region of the intermediate layer 3' and the inner pane 1. In this exemplary embodiment, the following applies, for example, regarding the permittivity: $\varepsilon_{r,3'} = 3 * \varepsilon_{r,3}$. By means of a suitable selection of the intermediate layer 3' between the antenna structure 4 and the base plate 5, the antenna properties can be particularly well-adjusted to the respective requirements.

Moreover, in this exemplary embodiment of an antenna structure 4 according to the invention, two rectangular cutouts 8 are arranged on both sides of the electrical line connection 13 between the antenna structure 4 and the signal line 11 in the base of the antenna structure 4. These rectangular cutouts 8 improve the decoupling of the antenna signal out of antenna structure 4.

FIG. 4E depicts a cross-sectional view along the section line D-D' of FIG. 4B. An exemplary embodiment of the electrical line connection 13 between the shield 12 of the strip conductor 10 and the base plate 5 are discernible. For this, a section of the shield 12 is arranged between the intermediate layer 3' and the base plate 5. The electrical line connection 13 between the shield 12 and the base plate 5 is roughly 10 mm from the pane edge 31. This makes it possible to obtain simple and reliable sealing of the line connection 13 within the pane composite that is mechanically stabilized and hermetically protected against moisture and, hence, against corrosion.

It is understood that this measure can also be advantageously combined with the other embodiments of the invention and, in particular, with the embodiment in FIGS. 3A and 3B.

FIG. 5 depicts an alternative exemplary embodiment, for example, of a vehicle antenna pane 100 according to the invention of FIGS. 4A to 4D, wherein only the base of the antenna structure 4 has a different shape than in FIGS. 4A to 4D. Here, the base is an ellipse, with the signal line 11 arranged at an angle of, for example, 45° relative to the major or minor axes. The length $l_A$ of the base of the antenna structure 4 corresponds in this example to the maximum diameter of the ellipse, i.e., the diameter in the direction of the major axis. The width $b_A$ corresponds in this example to the minimum diameter of the ellipse.

FIG. 6A to 6D depict an alternative exemplary embodiment, for example, of a vehicle antenna pane 100 according to the invention of FIG. 1A to 1D, wherein only the electrical contacting of the antenna structure 4 is designed differently. As shown in FIG. 6A to 6D, the signal line 11 is arranged in the plane of the base plate 5 and the shield 12, with the shield 12 transitioning in one piece into the base plate 5. The signal line 11 is capacitively coupled to the antenna structure 4 via the inner pane 1 as an intervening dielectric. The antenna signal is coupled via the dielectric to the capacitive coupling region 20 of the signal line 11 and guided to the connection element 14. This embodiment has the particular advantage that neither the signal line 11 nor the shield 12 has to be guided into the interior of the vehicle antenna pane 100. The complete electrical contacting is done via the plane of the base plate 5, which is arranged, in this example, outside the vehicle antenna pane 100. The base plate 5, the signal line 11, and the shield 12, which also serves in this example for the direct electrical contacting of the base plate 5, can also be arranged on a carrier film, for example, a polyimide film or a polyethylene terephthalate (PET) film, for example, with, in each case, a thickness of 0.05 mm. Alternatively, the base plate 5, the signal line 11, and the shield 12 can also be arranged on a dimensionally stable plastic carrier, such as a camera cover, and can be attached, for example, to the plastic carrier, by gluing, on the internal surface IV of the inner pane 1.

FIG. 7 depicts a flowchart of an exemplary embodiment of the method according to the invention for producing a vehicle antenna pane 100 according to the invention.

FIG. 8 depicts a measurement of the so-called $S_{11}$ parameter. For this, a network analyzer was connected to the input of the antenna via the connection element 14 and the input reflection was measured as a function of frequency. The $S_{11}$ parameter gives information as to how well (or, how poorly) the input is adapted to a reference system (here, 50 ohm) and, hence, gives a measurement as to what share of the electrical signal is converted into an electromagnetic signal and is emitted by the antenna. A high $S_{11}$ value (here, for example, −5 dB) indicates that the input signal is strongly reflected, the antenna is poorly tuned to this frequency, and, consequently, the antenna is not effectively converting the electrical signal fed in into emitted electromagnetic radiation. A low $S_{11}$ value (here, for example, −40 dB) indicates that the input signal is being reflected only slightly, i.e., the antenna is well tuned to this frequency and, consequently, the electrical signal fed in is very effectively converted into emitted electromagnetic radiation. From good signal adaptation, it can also be concluded that the antenna absorbs incoming electromagnetic radiation well in the appropriate frequency band and effectively converts it into an electrical signal.

FIG. 8 depicts in Example 1 (dotted line) a measurement of the $S_{11}$ parameter in the frequency range from 1 GHz to 2 GHz on a vehicle antenna pane 100 in accordance with the exemplary embodiment of FIG. 1A to 1F. The vehicle antenna pane 100 was tested on a test bench. In other words, it was not installed in a vehicle body. The measurement yielded a minimum value of roughly −13 dB at a frequency of roughly 1,575 GHz. As a reference value, the frequency of 1,575 GHz is entered as a vertical dashed line in the diagram.

The measurement shows that the vehicle antenna pane 100 of Example 1 has very good antenna characteristics for GPS reception, since it has, in the range from 1.50 GHz to 1.65 GHz, an $S_{11}$ value of less than −10 dB and thus has adequately broad bandwidth for good GPS reception and also for good GLONASS reception.

FIG. 8 further depicts in Example 2 (solid line) a measurement of the $S_{11}$ parameter of the vehicle antenna pane 100 of Example 1, wherein the vehicle antenna pane 100 was installed in a vehicle body. The measurement yielded a value of −18 dB at the GPS frequency of 1,575 GHz and even the minimum value of roughly −42 dB at a frequency of roughly 1.65 GHz.

The vehicle antenna pane 100 of Example 2 has, in the installed state, wherein the strip conductor 10 serving as the feedline is guided in the immediate vicinity of the mounting frame of the vehicle body, in the GPS- and GLONASS-relevant frequency range from 1.50 GHz to 1.65 GHz significantly better reception properties (lower $S_{11}$ values) than the vehicle antenna pane 100 in the non-installed state of Example 1. This result was unexpected and surprising for the person skilled in the art.

In summary, the present invention consists in providing an improved vehicle pane in which an antenna and, in particular, a GPS/GLONASS antenna can be integrated easily and economically.

LIST OF REFERENCE CHARACTERS

1 inner pane
2 outer pane
3,3' intermediate layer
4 antenna structure
5 base plate
6 slot-shaped cutout 7 triangular cutout
8 rectangular cutout
10 strip conductor, foil conductor
11 signal line
12 shield
13 electrical line connection
14 connection element
15 inner conductor
16 electrical insulation
20 capacitive coupling region
30, 31 pane edge
32 blockout print
33 communication window
100 vehicle antenna pane
A area of the orthogonal projection of the antenna structure 4
$a_D$ leg length of the triangular cutout 7
$b_A$ width of the antenna structure 4
$b_G$ width of the base plate 5
$b_S$ width of the slot-shaped cutout 6
$\varepsilon_{r,1/2}$ relative permittivity of the inner pane 1 or the outer pane 2
$\varepsilon_{r,3}$, $\varepsilon_{r,3'}$ relative permittivity of the intermediate layer 3, 3'
$l_A$ length of the antenna structure 4
$l_G$ length of the base plate 5
$l_S$ length of the slot-shaped cutout 6
A-A' section line
B-B' section line
C-C' section line
Z detail
I external surface of the outer pane 2
II internal surface of the outer pane 2
III external surface of the inner pane 1
IV internal surface of the inner pane 1

The invention claimed is:

1. A vehicle antenna pane configured to separate a vehicle interior from external surroundings, the vehicle antenna pane comprising:
   an inner pane having an external surface,
   an outer pane having an internal surface,
   at least one intermediate layer that connects the internal surface of the outer pane areally with the external surface of the inner pane,
   a planar antenna structure that is arranged between the inner pane and the outer pane, and a base plate that is arranged on an interior side in relation to the planar antenna structure,
   wherein
   at least one dielectric is arranged between the planar antenna structure and the base plate,
   the at least one dielectric consists of at least one of: a) the inner pane, b) the at least one intermediate layer, and c) the inner pane and the at least one intermediate layer,
   the planar antenna structure has a base with a ratio of a length $l_A$ of the base to a width $b_A$ of the base that is in a range of 1:1 to 10:1,
   the base plate is arranged at least in a region of an orthogonal projection of the planar antenna structure relative to the inner pane, and
   a foot point of the planar antenna structure is guided via a foil conductor from said foot point to a side edge of the vehicle antenna pane and out of the vehicle antenna pane, wherein the foil conductor, at least in one region that can be arranged adjacent a motor vehicle body and that extends from said foot point to said side edge, is implemented as a strip conductor having a shield that is electrically connected to the base plate, the shield being coplanar with the strip conductor in said at least one region.

2. The vehicle antenna pane according to claim 1, wherein at least one of the planar antenna structure and the base plate comprises one or more of:
   a printed and fired electrically conductive paste,
   an electrically conductive foil, preferably a metal foil, and
   an electrically conductive structure that is electrically isolated from an electrically conductive layer by a coating-free separation zone surrounded by the electrically conductive layer.

3. The vehicle antenna pane according to claim 2, wherein the printed and fired electrically conductive paste comprises a silver-containing screen printing paste.

4. The vehicle antenna pane according to claim 2, wherein the electrically conductive foil is a metal foil comprising one of: a) a copper foil, b) a silver foil, c) a gold foil and d) an aluminum foil.

5. The vehicle antenna pane according to claim 2, wherein the electrically conductive layer has a sheet resistance in a range of 0.4 ohm/square to 200 ohm/square.

6. The vehicle antenna pane according to claim 2, wherein the electrically conductive layer contains at least one of: a) silver (Ag), b) indium tin oxide (ITO), c) fluorine-doped tin oxide ($SnO_2$:F), and d) aluminum-doped zinc oxide (ZnO:Al).

7. The vehicle antenna pane according to claim 2, wherein at least one of the planar antenna structure and the base plate consists of a printed and fired electrically conductive paste having a thickness of 3 μm to 20 μm and a sheet resistance of 0.001 ohm/square to 0.03 ohm/square.

8. The vehicle antenna pane according to claim 7, wherein the printed and fired electrically conductive paste comprises a silver-containing screen printing paste.

9. The vehicle antenna pane according to claim 7, wherein the sheet resistance is in a range of 0.002 ohm/square to 0.018 ohm/square.

10. The vehicle antenna pane according to claim 2, wherein the electrically conductive foil has a thickness of 50 μm to 1000 μm, and a conductivity of $1*10^6$ S/m to $10*10^7$ S/m.

11. The vehicle antenna pane according to claim 10, wherein the electrically conductive foil has a thickness of 100 μm to 600 μm.

12. The vehicle antenna pane according to claim 1, wherein the strip conductor is a coplanar strip conductor.

13. The vehicle antenna pane according to claim 1, wherein the shield is arranged on a carrier film.

14. The vehicle antenna pane according to claim 13, wherein the carrier film contains polyimide or polyethylene terephthalate (PET).

15. The vehicle antenna pane according to claim 13, wherein the carrier film has a relative permittivity of 2 to 4.

16. The vehicle antenna pane according to claim 1, wherein the planar antenna structure and at least one of: a) a signal line of the foil conductor, and b) the base plate and the shield of the foil conductor, are implemented in one piece.

17. The vehicle antenna pane according to claim 16, wherein the signal line is arranged on a carrier film.

18. The vehicle antenna pane according to claim 17, wherein the carrier film contains polyimide or polyethylene terephthalate (PET).

19. The vehicle antenna pane according to claim 18, wherein the carrier film has a relative permittivity of 2 to 4.

20. The vehicle antenna pane according to claim 1, wherein the base plate has a grounding region and a capacitive coupling region for capacitive coupling or decoupling of an antenna signal.

21. The vehicle antenna pane according to claim 1, wherein the at least one intermediate layer has, in a first region between the planar antenna structure and the base plate, a dielectric with relative permittivity $\varepsilon_{r,3'}$ that is greater than a relative permittivity $\varepsilon_{r,3}$ of a dielectric of the at least one intermediate layer in a region surrounding the first region.

22. The vehicle antenna pane according to claim 21, wherein $\varepsilon_{r,3'} \geq 3 * \varepsilon_{r,3}$.

23. The vehicle antenna pane according to claim 1, wherein at least one of the planar antenna structure and the base plate is arranged on a carrier film.

24. The vehicle antenna pane according to claim 23, wherein the carrier film contains polyimide or polyethylene terephthalate (PET).

25. The vehicle antenna pane according to claim 23, wherein the carrier film has a relative permittivity of 2 to 4.

26. The vehicle antenna pane according to claim 1, wherein at least one of the inner pane and the outer pane contains glass or polymers.

27. The vehicle antenna pane according to claim 26, wherein the glass is one of: a) flat glass, b) float glass, c) quartz glass, d) borosilicate glass, and e) soda lime glass.

28. The vehicle antenna pane according to claim 27, wherein the polymers comprises one or more of: a) polyethylene, b) polypropylene, c) polycarbonate, d) polymethylmethacrylate, and e) mixtures thereof.

29. The vehicle antenna pane according to claim 26, wherein at least one of the inner pane and the outer pane has a relative permittivity $\varepsilon_{r,1/4}$ of 2 to 8.

30. The vehicle antenna pane according to claim 2,
wherein at least one of the planar antenna structure and the base plate consists of an electrically conductive structure that is electrically isolated from an electrically conductive layer by means of a completely, or sectionwise, coating-free separation zone surrounded by the electrically conductive layer, and
wherein a width of the coating-free separation zone is greater than or equal to 5 mm.

31. A vehicle antenna pane arrangement comprising:
the vehicle antenna pane according to claim 1, and
receiving or transmitting electronics that are electrically coupled to the planar antenna structure and the base plate of the vehicle antenna pane,
wherein the vehicle antenna pane is arranged as glazing in a vehicle body.

32. A method for producing a vehicle antenna pane, the method comprising:
(a) producing a stack sequence of an inner pane, at least one intermediate layer, and an outer pane, wherein a planar antenna structure is arranged between the inner pane and the outer pane, and a base plate is arranged on an interior side in relation to the planar antenna structure, and
(b) laminating the stack sequence to form the vehicle antenna pane, wherein at least one dielectric is arranged between the planar antenna structure and the base plate,
the at least one dielectric consists of at least one of: a) the inner pane, b) the at least one intermediate layer, and c) the inner pane and the at least one intermediate layer,
the planar antenna structure has a base with a ratio of a length $l_A$ of the base to a width $b_A$ of the base that is in a range of 1:1 to 10:1, and
the base plate is arranged at least in a region of an orthogonal projection of the planar antenna structure relative to the inner pane,
wherein a foot point of the planar antenna structure is guided via a foil conductor from said foot point to a side edge of the vehicle antenna pane and out of the vehicle antenna pane, wherein the foil conductor, at least in one region that can be arranged adjacent a motor vehicle body and that extends from said foot point to said side edge, is implemented as a strip conductor having a shield that is electrically connected to the base plate, the shield being coplanar with the strip conductor in said at least one region.

33. A method, comprising using of the vehicle antenna pane according to claim 1 in means of transportation for travel on land, in the air, or on water,
wherein the means of transportaion comprises motor vehicles, and
wherein the vehicle antenna pane is used as one of: a) a windshield, b) a rear window, c) a side windows, and d) a roof panel, of the means of transportation.

34. A method, comprising using of the vehicle antenna pane according to claim 1 for reception of signals for satellite-supported navigation,
wherein the signals comprises one or more of a right circularly polarized GPS signal with an L1 frequency of 1575.42 MHz, and a GLONASS signal with a frequency of 1602 MHz ±4 MHz.

35. The vehicle antenna pane according to claim 1, wherein the shield is spaced apart from the strip conductor in said at least one region.

* * * * *